(12) United States Patent
Bognar et al.

(10) Patent No.: US 10,444,985 B2
(45) Date of Patent: Oct. 15, 2019

(54) COMPUTING DEVICE RESPONSIVE TO CONTACT GESTURES

(71) Applicant: Rescan, Inc., Redwood City, CA (US)

(72) Inventors: Botond Bognar, Budapest (HU); Robert Herman, San Carlos, CA (US); Adam Croston, San Jose, CA (US)

(73) Assignee: RESCAN, INC., Redwood City, CA (US)

( * ) Notice: Subject to any disclaimer, the term of this patent is extended or adjusted under 35 U.S.C. 154(b) by 0 days.

(21) Appl. No.: 15/919,585

(22) Filed: Mar. 13, 2018

(65) Prior Publication Data

US 2018/0210642 A1 Jul. 26, 2018

Related U.S. Application Data

(63) Continuation-in-part of application No. 15/388,935, filed on Dec. 22, 2016, and a continuation-in-part of
(Continued)

(51) Int. Cl.
*G06F 3/0488* (2013.01)
*G06F 3/0485* (2013.01)
(Continued)

(52) U.S. Cl.
CPC ....... *G06F 3/04883* (2013.01); *G05D 1/0016* (2013.01); *G05D 1/0044* (2013.01);
(Continued)

(58) Field of Classification Search
CPC .............. G06F 3/04883; G06F 3/0346; G06F 3/04845; G06F 3/011; G05D 1/0016;
(Continued)

(56) References Cited

U.S. PATENT DOCUMENTS

| 2010/0100240 | A1 | 4/2010 | Wang et al. |
| 2010/0188397 | A1* | 7/2010 | Tsai ............... G06F 1/1626 345/419 |

(Continued)

OTHER PUBLICATIONS

PCT/US18/22173, International Search Report and Written Opinion, dated May 29, 2018.

*Primary Examiner* — Stephen G Sherman
(74) *Attorney, Agent, or Firm* — Royse Law Firm, PC

(57) ABSTRACT

Touchscreen-enabled devices are provided to display images of either real or virtual environments, the devices having user interfaces including a graphical overlay laid over the images for navigating the environments. The device can interpret gestures made by the user on the touchscreen as commands, and the graphical overlay guides the user as to where to make the gestures to achieve intended maneuvers such as translations of the point of view and rotations of the point of view within the displayed environment. The graphical overlay can comprise only a single symbol, and gestures that originate within the area of the display marked by the symbol are differentiated from those gestures originating from outside of the symbol, where the differentiated gestures control translation and rotation, respectively. This allows for one-finger navigation of the environment.

20 Claims, 5 Drawing Sheets

Related U.S. Application Data application No. 15/389,059, filed on Dec. 22, 2016, now Pat. No. 10,089,784.

(60) Provisional application No. 62/470,405, filed on Mar. 13, 2017.

(51) Int. Cl.

| | |
|---|---|
| *G05D 1/00* | (2006.01) |
| *G06F 3/0484* | (2013.01) |
| *G06F 3/0346* | (2013.01) |
| *G05D 1/02* | (2006.01) |
| *H04N 5/232* | (2006.01) |
| *G06F 3/0489* | (2013.01) |
| *G06F 1/16* | (2006.01) |
| *G06F 3/01* | (2006.01) |
| *G06F 3/0481* | (2013.01) |

(52) U.S. Cl.
CPC ......... *G05D 1/0227* (2013.01); *G06F 1/1601* (2013.01); *G06F 1/1694* (2013.01); *G06F 3/011* (2013.01); *G06F 3/0346* (2013.01); *G06F 3/04815* (2013.01); *G06F 3/04845* (2013.01); *G06F 3/04886* (2013.01); *G06F 3/04895* (2013.01); *H04N 5/23203* (2013.01); *G05D 2201/0211* (2013.01); *G06F 2200/1612* (2013.01); *G06F 2200/1614* (2013.01); *G06F 2200/1637* (2013.01)

(58) Field of Classification Search
CPC ............... G05D 1/0044; G05D 1/0227; G05D 2201/0211; H04N 5/23203; B25J 13/081

See application file for complete search history.

(56) References Cited

U.S. PATENT DOCUMENTS

| | | | |
|---|---|---|---|
| 2011/0163874 A1* | 7/2011 | van Os | G01C 21/367 340/539.13 |
| 2013/0169579 A1 | 7/2013 | Havnor | |
| 2013/0194176 A1* | 8/2013 | Chung | G06F 3/0346 345/156 |
| 2014/0218313 A1* | 8/2014 | Zhang | G06F 3/04883 345/173 |
| 2014/0368457 A1 | 12/2014 | Shenfield | |
| 2015/0178523 A1 | 6/2015 | Gelay et al. | |
| 2015/0182856 A1* | 7/2015 | Mays, III | A63F 13/2145 463/31 |
| 2015/0242111 A1* | 8/2015 | Balakrishnan | G06F 3/04855 715/787 |
| 2016/0275987 A1* | 9/2016 | Le Clerc | G11B 27/031 |
| 2017/0269572 A1* | 9/2017 | Zhang | B25J 13/06 |

* cited by examiner

COMPUTING DEVICE RESPONSIVE TO CONTACT GESTURES

CROSS-REFERENCE TO RELATED APPLICATIONS

This application claims the benefit of U.S. Provisional Patent Application No. 62/470,405 filed on Mar. 13, 2017 and entitled "Navigation System;" this application is also a Continuation-in-Part of U.S. patent application Ser. No. 15/388,935 filed on Dec. 22, 2016 and entitled "Head-Mounted Sensor System" and further a Continuation-in-Part of U.S. patent application Ser. No. 15/389,059 also filed on Dec. 22, 2016 and entitled "Head-Mounted Mapping Methods." The disclosures of all three noted applications are incorporated herein by reference.

BACKGROUND

Field of the Invention

The present invention is in the field of hand-held computing devices and more particularly to their use for displaying and navigating within representations of real and virtual environments.

Related Art 2D and 3D representations of virtual environments are well known in video games, for example, where one or more joysticks are used to navigate, for example, one joystick can be used to advance, retreat, and turn left and right. Similar controls have been adapted to the touchscreens of mobile devices.

SUMMARY

The present invention is directed to a computing device comprising a touchscreen display and logic including a micro-processor. Exemplary computing devices include hand-held devices as well as stationary devices. In various embodiments the computing device further comprises an I/O configured to communicate with external devices via a communication channel and/or an image storage configured to store a representation of a navigable environment. Devices of the present invention optionally can also comprise an image source configured to generate information sufficient to create the representation of the navigable environment.

The logic is configured to display an image of a navigable environment on the touchscreen display, the image characterized by a viewpoint having a position in the navigable environment and an angle in the navigable environment. The navigable environment comprises a virtual reality environment, a game environment, or a real environment in various embodiments. The logic is further configured to receive touch information from the touchscreen display and filter the touch information to identify contact gestures, each contact gesture having an origination point on the display. The logic is configured further to, for contact gestures having an origination point within a first part of the touchscreen display, vary the image on the touchscreen display to change the position of the viewpoint of the image. The logic is also configured to, for contact gestures having an origination point within a second part of the touchscreen display that does not overlap with the first part of the touchscreen display, vary the image on the touchscreen display to change an angle of the viewpoint of the image.

In various embodiments, the logic is further configured to overlay a first symbol over the image of the navigable environment, where the first symbol is aligned with the first part of the touchscreen display. In some of these embodiments, the logic is further configured to overlay a second symbol over the image of the navigable environment, the second symbol being aligned with the second part of the touchscreen display. The logic can be further configured, for contact gestures having the origination point within the first part of the touchscreen display and including a swipe, to move the first symbol from a location where it is aligned with the first part of the touchscreen display and along a path traced by the swipe.

In some embodiments in which the device is hand-held, the device includes an orientation sensor and the logic is further configured to receive orientation information from the orientation sensor, switch the display of the image of the navigable environment between landscape mode and portrait mode based on the orientation information, and overlay a first symbol over the image of the navigable environment, the first symbol being aligned with the first part of the touchscreen display. Further, the logic is still further configured to, when the display of the image of the navigable environment is switched to the landscape mode, overlay a second symbol over the image of the navigable environment, the second symbol being aligned with a third part of the touchscreen display within the second part of the touchscreen display. In these embodiments, the logic is further configured, while in the landscape mode, to filter the touch information to identify contact gestures that originate within the third part of the touchscreen display, and to vary the image on the touchscreen display to change the angle of the viewpoint of the image in response thereto.

In various embodiments, the second part of the touchscreen display comprises the entire area of the touchscreen display outside of the first part of the touchscreen display. Also, in some embodiments, the logic is further configured, for contact gestures including a swipe and having the origination point within the second part of the touchscreen display, to vary the angle of the viewpoint proportionally to a length of the swipe. The logic may be further configured, for contact gestures having the origination point within the first part of the touchscreen display, to vary the position of the viewpoint proportionally to a length of a touch contact time on the touchscreen display. The logic can further be configured, for contact gestures having the origination point within the first part of the touchscreen display and having a curved swipe, to vary the position of the viewpoint along a curve.

In various embodiments, the logic is further configured to overlay a mini-map of the navigable environment over the image of the navigable environment. In some of these embodiments the logic is further configured to filter the touch information to identify contact gestures that comprise a tap, and further configured to provide the mini-map in response to contact gestures that comprise the tap. Also, in some embodiments in which the logic is further configured to overlay the mini-map, the logic is further configured to filter the touch information to identify contact gestures that comprise a tap, and further configured to save the image in response to contact gestures that comprise the tap.

In further embodiments in which the computing system comprises a hand-held device, the hand-held device includes an orientation sensor and the logic is further configured to receive orientation information from the orientation sensor and switch the display of the image of the navigable environment between landscape mode and portrait mode based on the orientation information. In these embodiments the first part of the touchscreen display can be positioned within an area of the touchscreen display and the logic can be further configured to, when in the portrait mode, position the first part of the touchscreen display such that it is spaced apart from a first edge of the touchscreen display by a first distance, and spaced apart from a second edge of the touchscreen display, which is longer than the first edge, by a second distance, and when in the landscape mode, position the first part of the touchscreen display such that it is spaced apart from the first edge of the touchscreen display by the second distance, and spaced apart from the second edge of the touchscreen display by the first distance.

The present invention also provides a telepresence system comprising a mobile telepresence robot and a controller device. The telepresence robot is steerable in two dimensions in a real environment in response to received commands. The robot includes a camera, a first I/O configured to communicate via a communication channel, and logic configured to stream video from the camera through the I/O and over the communication channel. The controller device includes a second I/O configured to communicate with the telepresence robot via the communication channel, a touchscreen display, and logic including a micro-processor. The logic is configured to display the streaming video on the touchscreen display, where the video is characterized by a viewpoint having a position in the real environment. The logic is further configured to receive touch information from the touchscreen display, filter the touch information to identify contact gestures each having an origination point on the display, and for contact gestures having an origination point within a first part of the touchscreen display, send a command to the telepresence robot to move within the real environment to change the position of the viewpoint of the video.

DETAILED DESCRIPTION

The present invention is directed to devices with touchscreen user interfaces that are able to display images on the touchscreen that can be 2D or 3D representations of either real or virtual environments, and also directed to a graphical overlay that is displayed as if laid over the images on the touchscreen. The device can interpret contact gestures made by the user on the touchscreen as commands to navigate through the environment. The graphical overlay guides the user as to where to place contact gestures on the touchscreen in order to achieve intended maneuvers. Maneuvers can include, for example, translations of the point of view, rotations of the point of view, and combinations thereof, within the displayed environment. The device can be a hand-held device, in some embodiments, but can also be a device that includes a fixed display, such as one that includes a display mounted on a wall.

More specifically, the graphical overlay can comprise only a single symbol, such as a circle, while in other embodiments the overlay comprises two symbols. In single symbol embodiments, contact gestures that originate within the area of the display marked by the symbol are differentiated from those contact gestures originating from outside of the symbol. In two symbol embodiments, contact gestures that originate within one symbol are differentiated from those contact gestures originating within the other symbol. In either case, the differentiated contact gestures control translation and rotation, respectively. With devices of the present invention, a user is provided with a user interface to navigate a displayed environment using only a single finger. The resulting user experience feels like a proper walk through as if it were in a computer game.

Figure 1:
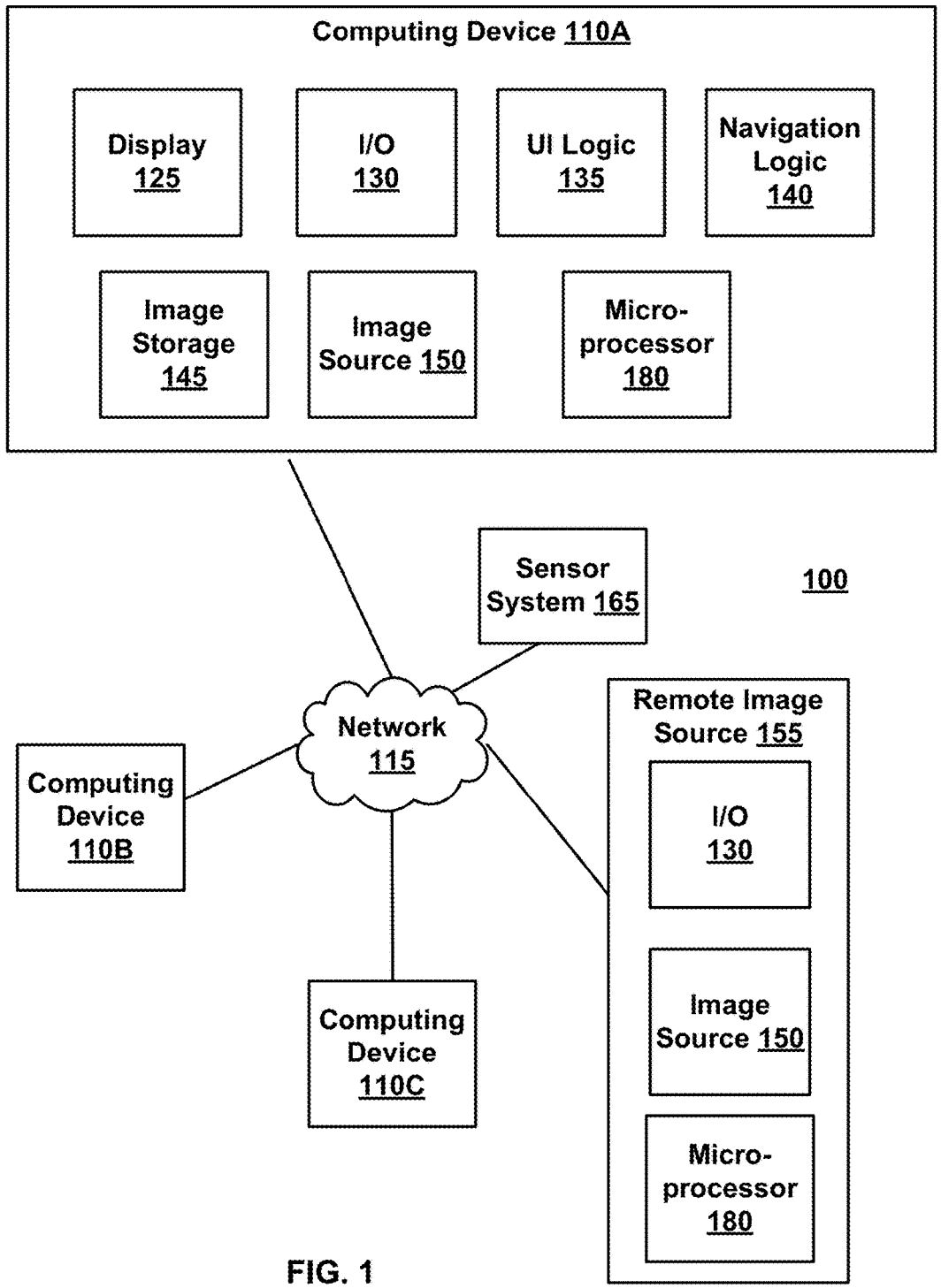
FIG. 1 illustrates a communication network including at least one computing device, according to various embodiments of the invention.

FIG. 1 illustrates a Communication System 100 including at least one Computing Device 110A, according to various embodiments of the invention. Communication System 100 optionally includes additional Computing Devices 110B, 110C, etc. Computing Devices 110 are optionally configured to communicate via a Network 115. The Network 115 can include the Internet, a cellular network, a wireless network, a local area network, and/or the like, and combinations thereof.

Computing Device 110A includes a touchscreen Display 125 able to detect a contact of a digit (e.g., thumb or finger) of a user on the surface of the Display 125, and exemplary Computing Devices 110A include smartphones and tablets, as well as other types of computing systems with touchscreens like laptop computers and systems having wall-mounted touchscreens displays. Contact gestures, as used herein, are interactions of the digit with respect to the Display 125 that include either touch or close enough proximity to the Display 125 to be recognized thereby. Exemplary contact gestures include a tap (brief touch), a double tap, a touch at a first point and swiping (maintaining contact) to a second point, a touch and hold at a specific point, and/or the like. A path traced by the user's digit across the surface of the Display 125 can be part of a contact gesture. Other contact gestures can include an arch, circle, etc. Dragging, as used herein, is swiping where an object being displayed on the Display 125 moves with the digit during the swipe. It should be understood that swiping, as used herein, does not require any kind of continuous motion is one direction or any kind of speed of the stroke, rather it refers to any sustained contact over some path, and so excludes a touch and release at a single location.

Computing Device 110A optionally further includes an I/O (input/output) 130 configured to communicate with external devices via a communication channel, e.g., Network 115. I/O 130 can include a communication port, a wireless communication circuit, etc.

Computing Device 110A optionally further includes an Image Storage 145, a non-transitory storage device such as RAM or Flash memory, for storing a representation of a navigable environment, such as through a collection of stored images, like photos of a real environment. Real and virtual environments can also be represented through stored information sufficient to construct the navigable environment, such as a 3D wireframe and a set of textures assigned to the various portions of the wireframe. As such, the navigable environment can comprise, for example, a virtual environment, a game environment, and/or a real environment. Image Storage 145 optionally includes data structures specifically configured to store images and/or a geometry of the environment.

As one example, images of a real environment can be used by a remote user holding the Device 110A to maneuver a distant telepresence robot through a real environment. In these embodiments, Image Storage 145 is not necessary where the images comprise streaming video received from the telepresence robot, though Image Storage 145 can be provided to buffer streaming video and/or record the streaming video for later playback. The representation of the navigable environment may also be generated on Computing Device 110A and/or received via Network 115 from an external device or source.

Computing Device 110A further includes User Interface (UI) Logic 135 and Navigation Logic 140. UI Logic 135 continuously receives touchscreen input in the form of touch information from the Display 125 while Navigation Logic 140 provides the navigable environment to the Display 125 together with one or more navigation symbols. These navigation symbols are overlaid over the displayed image of the navigable environment, and are used to indicate different functions (e.g., properties or functionalities) of different parts of the Display 125. Navigation symbols can include buttons, menu items, circles, icons, etc. as described further herein. Navigation symbols can be opaque to semi-transparent with respect to the image below. Navigation Logic 140 is optionally configured to present a different number of navigation symbols depending on an orientation of the Display 125 (e.g., portrait or landscape orientation/mode). Touch information can include identification of the pixels being touched, for example.

UI Logic 135 is configured to filter the received touch information to determine occurrences of contact gestures, and their locations, relative to the positions of the Symbols 210, 215 or any other symbols. When a contact gesture is identified by a filter, the information about the gesture is passed to the Navigation Logic 140. When an orientation of the Display 125 is switched by Navigation Logic 140, the Navigation Logic 140 updates the UI Logic 135 so that the filters can be updated to the new configuration. Each symbol 210, 215 is aligned with a part of the touchscreen Display 125, and the two parts do not overlap in embodiments where both Symbols 210, 215 are used. As used herein, "aligned with" means that the Symbols 210, 215 each overlay a number of pixels within the part of the Display 125 such that the pixels are coextensive or nearly coextensive with the Symbol 210, 215. If not completely coextensive, the part of the Display 125 that is aligned with a Symbol 210, 215 may be larger or smaller than the Symbol 210, 215 itself on the Display 125.

Figure 2A:
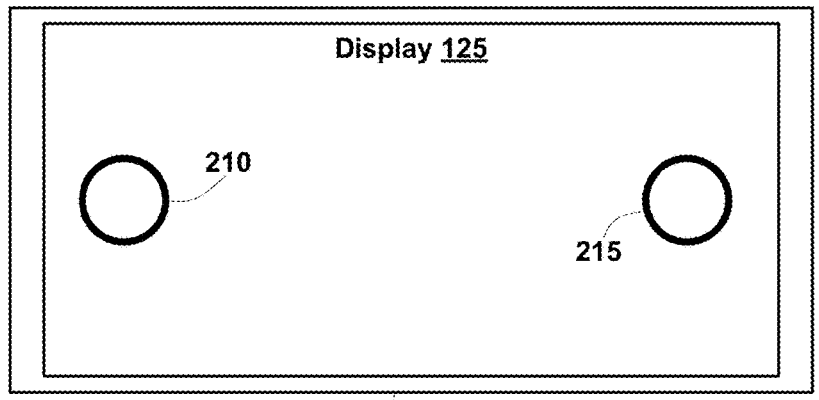
FIGS. 2A, 2B and 2C illustrate landscape and portrait modes of a user interface, according to various embodiments of the invention.
Figure 2B:
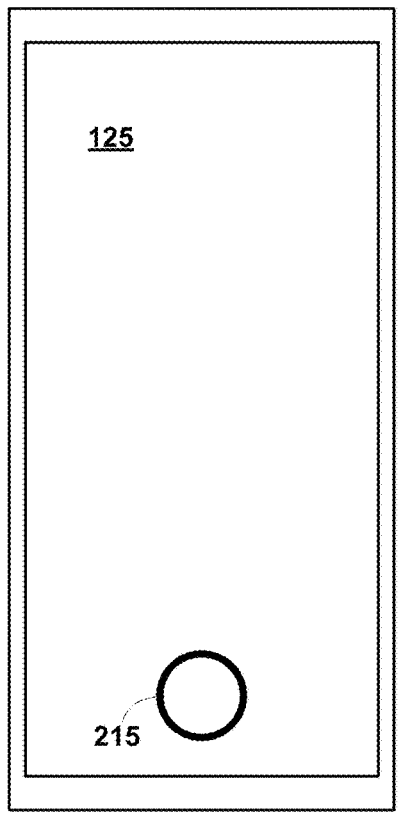
Figure 2C:
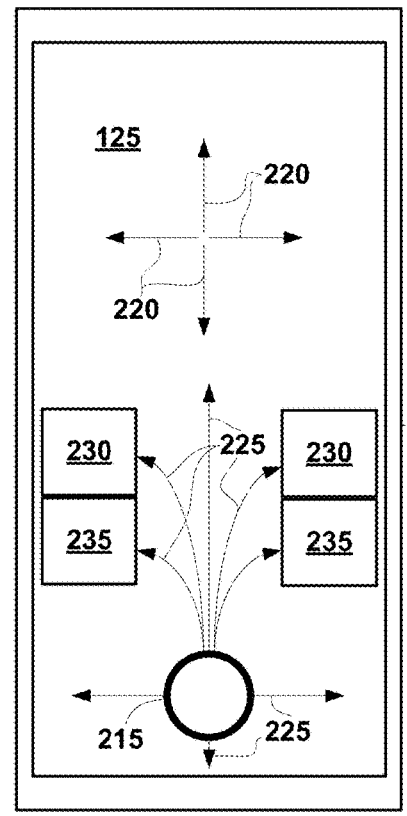
Figure 3:
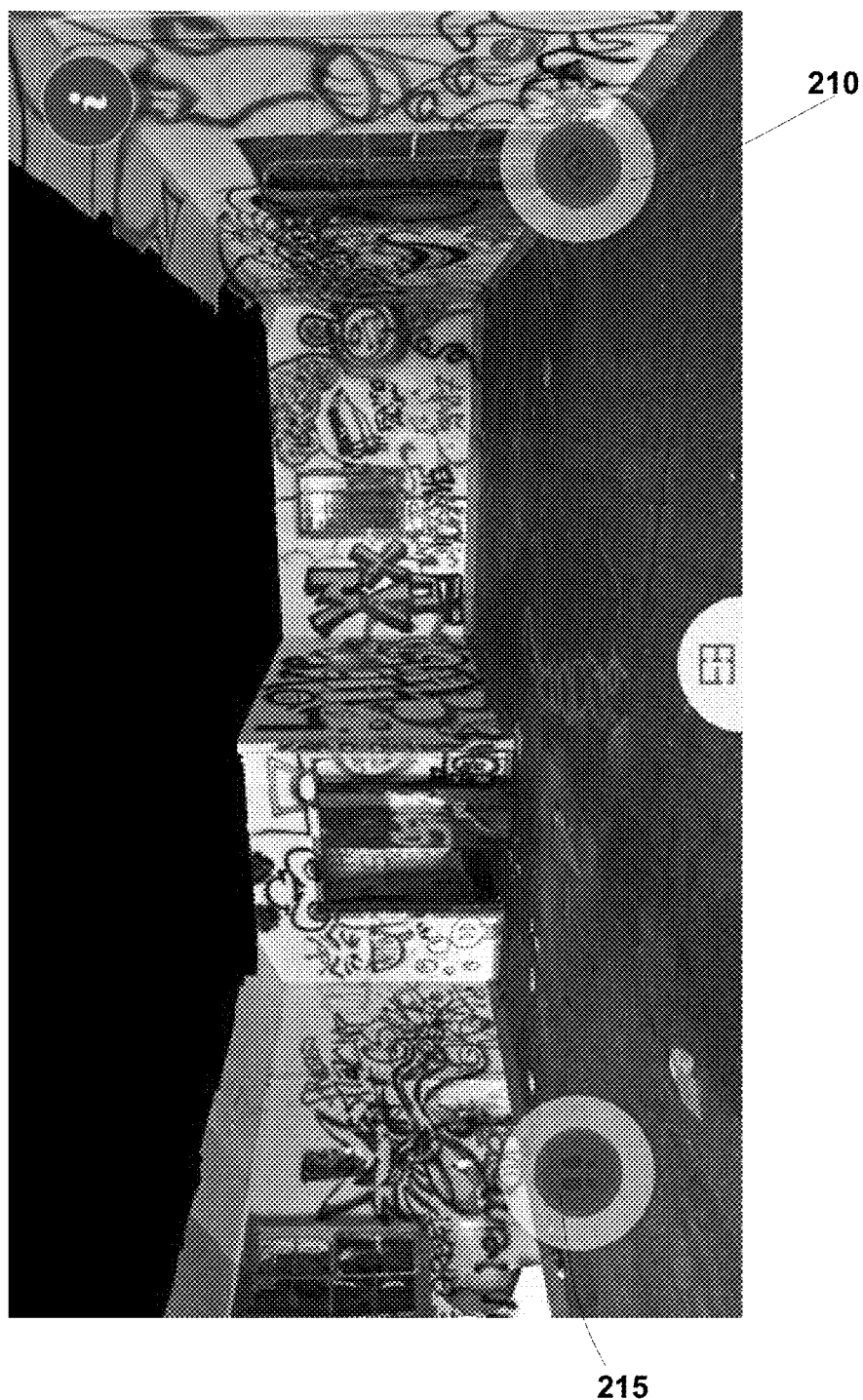
FIG. 3. Illustrates a screen capture of the user interface of FIG. 2A, according to various embodiments of the invention.

An exemplary Computing Device 110A is illustrated in FIGS. 2A-2C which show the Computing Device 110A in both the landscape (FIG. 2A) and portrait (FIGS. 2B and 2C) orientations. In the illustrated embodiment the Display 125 has a rectangular touch-sensitive display area in which the navigable environment is shown. For clarity, no such image is shown in FIGS. 2A-2C, only the Navigation Symbols 210, 215 which are overlaid above the image of the environment. FIG. 3 shows a screen shot of an environment overlaid with Symbols 210, 215 and a "mini-map" of the broader navigable environment.

In various embodiments, the Computing Device 110A includes an orientation sensor and the Navigation Logic 140 receives orientation information from the orientation sensor in order to automatically switch the Display 125 between portrait and landscape modes based on how the Computing Device 110A is held. In these embodiments, Symbols 210, 215 can be displayed by the Navigation Logic 140 to the left and right of center in the landscape orientation, while only one Symbol 215 is provided below center in the portrait orientation, as illustrated. Stationary displays, such as wall-mounted touchscreens, can employ either a single Symbol 215, or both, and can be switched therebetween in some embodiments.

Navigation Logic 140 is optionally similarly further configured to provide a partial or complete "mini-map" of the navigable environment on Display 125, that is, a representation of the navigable environment overlaid over a portion of the image as in FIG. 3. In some embodiments, this mini-map is optionally accessed by a contact gesture, such as a double tap on a specific part of Display 125, e.g., double tapping on the part of Display 125 represented by Symbol 215.

Navigation Logic 140 is optionally further configured to provide information regarding an object in the displayed image of the environment in response to a contact gesture, such as a touch and release. For instance, Navigation Logic 140 can include logic that maintains a register of selectable objects that are shown in the image presently displayed on the Display 125, some information about each object, and the coordinates of the pixels within the Display 125 corresponding to each such object, so that when the contact gesture is received from pixels corresponding to an object, the Navigation Logic 140 can add to the overlay the information for that object in an area of the Display 125 proximate to the selected object.

In other embodiments the Navigation Logic 140 is configured to employ an image analysis to identify objects in the environment, such as a real environment, like people and things within the image presently displayed on the Display 125. In some of these embodiments the Navigation Logic 140 can respond to a contact gesture by initiating the image analysis in an area around the pixels that were touched and if something is positively identified in the analyzed portion of the image, then the Navigation Logic 140 can display information stored for that object or person, or can search for information, and provide a brief summary as information in the overlay proximate to whatever was identified.

Navigation Logic 140 is optionally further configured to save the image presently displayed on the Display 125 in response to a contact gesture, the image being a screen shot but without the overlay provided by the present invention. Navigation Logic 140 is optionally further configured to reorient the displayed portion of the navigable environment in response to a contact gesture, for example, a contact gesture can reorient the displayed portion of the navigable environment to show the opposite (back) view.

Navigation Logic 140 is further configured to control both the angle and the position of a viewpoint, that is, change the location within the environment from which the environment is presented to the Display 125 as well as change the direction of the view from that location. "Position of a viewpoint" is the particular location, or point, in the environment from which the view originates. "Angle of a viewpoint" is the direction, in a coordinate system of the environment, in which the environment is observed from the position of the viewpoint. Changing the angle and position of the viewpoint has the effect of panning and zooming, analogous to a person at the position of the viewpoint turning their head or moving within the navigable environment.

As noted above, Navigation Logic 140 is further configured to receive from UI Logic 135 contact gestures and to recognize some as commands to change the position of the viewpoint, and to recognize other contact gestures as commands to change the viewpoint. Both types of contact gestures, in some embodiments, share in common that the gesture originates on a first part of the Display 125 and extends to another part of the Display 125 before ending. In some instances, a filter may recognize a contact gesture as initiated and pass the information to the Navigation Logic 140 before the contact gesture is completed. Accordingly, the Navigation Logic 140 can respond to a contact gesture and change the display of the environment while the contact gesture is still in progress.

The first and/or second parts of the display are optionally indicated by Symbols 210, 215. In some embodiments, a touch that originates at Symbol 210 is used to control the angle of the viewpoint while a touch that originates at Symbol 215 is used to control the position of the viewpoint itself. For instance, touching at Symbol 210 and swiping up results in an upward change in the angle of the viewpoint, touching at Symbol 210 and swiping right results in a rightward change in the angle of the viewpoint, etc. Touching at Symbol 215 and swiping upward results in movement of the position of the viewpoint forward in the navigable environment, touching at Symbol 215 and swiping right results in movement of the position of the viewpoint to the right, etc. The embodiments represented by FIG. 2A can be particularly useful when Computing Device 110A is a handheld device and held with two hands so that each thumb is used to touch the Symbols 210 and 215 respectively. In some embodiments, touching at Symbol 210 serves to select the Symbol 210 such that the Symbol 210 is dragged along with any swipe that originates therein. At the end of the contact gesture, the Symbol 210 is returned to its home location on the Display 125.

Display 125 is shown in FIG. 2B in the portrait mode. In some embodiments, only one of Symbols 210, 215 is provided by Navigation Logic 140 when in the portrait mode. The operations of UI Logic 135 and Navigation Logic 140 are, thus, optionally dependent on the orientation of Computing Device 110A. The functionality of different parts of Display 125 may change depending on the orientation of Display 125. In the example shown, Symbol 215 represents the part of Display 125 from which the position of the viewpoint is manipulated. A contact gesture that originates in this part of Display 125 and swipes outward therefrom is interpreted by UI Logic 135 as a command to change the position of the viewpoint within the environment. Optionally, a touch that originates in any other part of Display 125 and swiped is interpreted by UI Logic 135 as a command to change the angle of the viewpoint. Thus, a person can use a single hand to hold Computing Device 110A and use the thumb of that hand to change viewpoint position by touching at Symbol 215, and use their thumb to swipe elsewhere on Display 125 to change the angle of the viewpoint.

FIG. 2C illustrates examples of swiping motions that may occur on Display 125 in the landscape mode. Swipes 220 that originate from outside of the Symbol 215 are used to change the angle of the viewpoint, and in some embodiments this includes the entire touch-sensitive surface of the Display 125 that is outside of the Symbol 215, or can be in just a portion of the Display 125 outside of the Symbol 215. The length or strength of a Swipe 220 can optionally be used as a means of control, for instance, the amount of change of the angle of the viewpoint can be proportional to the length of the swipe 220.

In FIG. 2C, Swipes 225 that originate at the part of the Display 125 indicated by Symbol 215 are used to change the position of the viewpoint. In various embodiments, swiping can be along a straight or a curved path. The path of a swipe optionally is interpreted by UI Logic 135 as a contact gesture having a specific meaning. The degree of curvature of a swiping gesture is optionally used to control a curvature of a path along which viewpoint position is changed for the displayed environment. For example, a gesture that originates at Symbol 215 and curves to the area indicated by Boxes 230 in FIG. 2C results in a position of the viewpoint change forward with a gradual turn (right or left). In contrast, a gesture that originates at Symbol 215 and curves to the area indicated by either Box 235 results in a position change forward with a relatively sharper turn. A gesture with an even greater curvature may result in a U-turn in viewpoint position. This simulates a person sharply turning around, analogous to a 180-degree rotation of the angle of the viewpoint. Boxes 230 and 235 are not necessarily visible on Display 125 but merely represent, for the sake of illustration, regions of the Display 125. As such, boxes 230 and 235 may represent either discrete regions or a continuum in which a large number of alternative gestures may terminate.

In some embodiments, a contact gesture originating from the area of Display 125 indicted by Symbol 215 can be held on the Display 125 at the end of the gesture. In other words, if the user leaves their digit on Display 125 after swiping a distance from Symbol 215, the resulting change (rate and direction) in the position of the viewpoint will continue until the digit is lifted from Display 125. Where motion continues until the digit is lifted, the amount of viewpoint position change is dependent on the length of time the digit is in contact with Display 125.

Note that the part of the Display 125 used to control the angle of the viewpoint includes a greater amount of the Display 125 in portrait mode relative to landscape mode. Specifically, a ratio of an area of the part of the display for viewpoint change to an area of the first part of the display for position change is greater in portrait mode relative to landscape mode.

Computing Device 110A optionally further includes an Image Source 150. Image Source 150 can include, for example, rendering logic configured to generate the information sufficient to construct the navigable environment, like images or a 3D wireframe and a set of textures, that are stored in the Image Storage 145. Computing Device 110A further includes a Microprocessor 180 configured to execute at least the Navigation Logic 140, but also one or more of the UI Logic 135, Image Source 150, I/O 130 and any other logic herein that requires a microprocessor to implement coded instructions.

The "logic" discussed herein includes hardware, firmware, and/or software stored on a non-transient computer readable medium. UI Logic 135 and Navigation Logic 140 may be used to navigate a virtual reality environment, to navigate a game environment, to navigate a telepresence robotic device in the real world, and/or the like. It should be noted that the divisions made here between UI Logic 135 and Navigation Logic 140 are exemplary, and the functions they provide can be integrated into a singular logic or distributed across three or more logics.

Communication System 100 optionally further includes a Remote Image Source 155 in communication with Computing Device 110A across Network 115. In some embodiments, the information sufficient to construct the navigable environment that is stored in Image Storage 145 is generated at least in part by Remote Image Source 155. Remote Image Source 155 can include embodiments of I/O 130, Image Source 150, Microprocessor 180, and/or the like.

Communication System 100 optionally further includes a Sensor System 165 configured to generate data characterizing a real-world navigable environment from which the information sufficient to construct the navigable environment can be further generated. Sensor System 165 can range from one or more optical cameras to more complex systems able to gauge distance as well as to collect images such as those described in U.S. patent application Ser. Nos. 15/389,059 and 15/388,935. In some embodiments, Computing Device 110A includes Sensor System 165.

Figure 4:
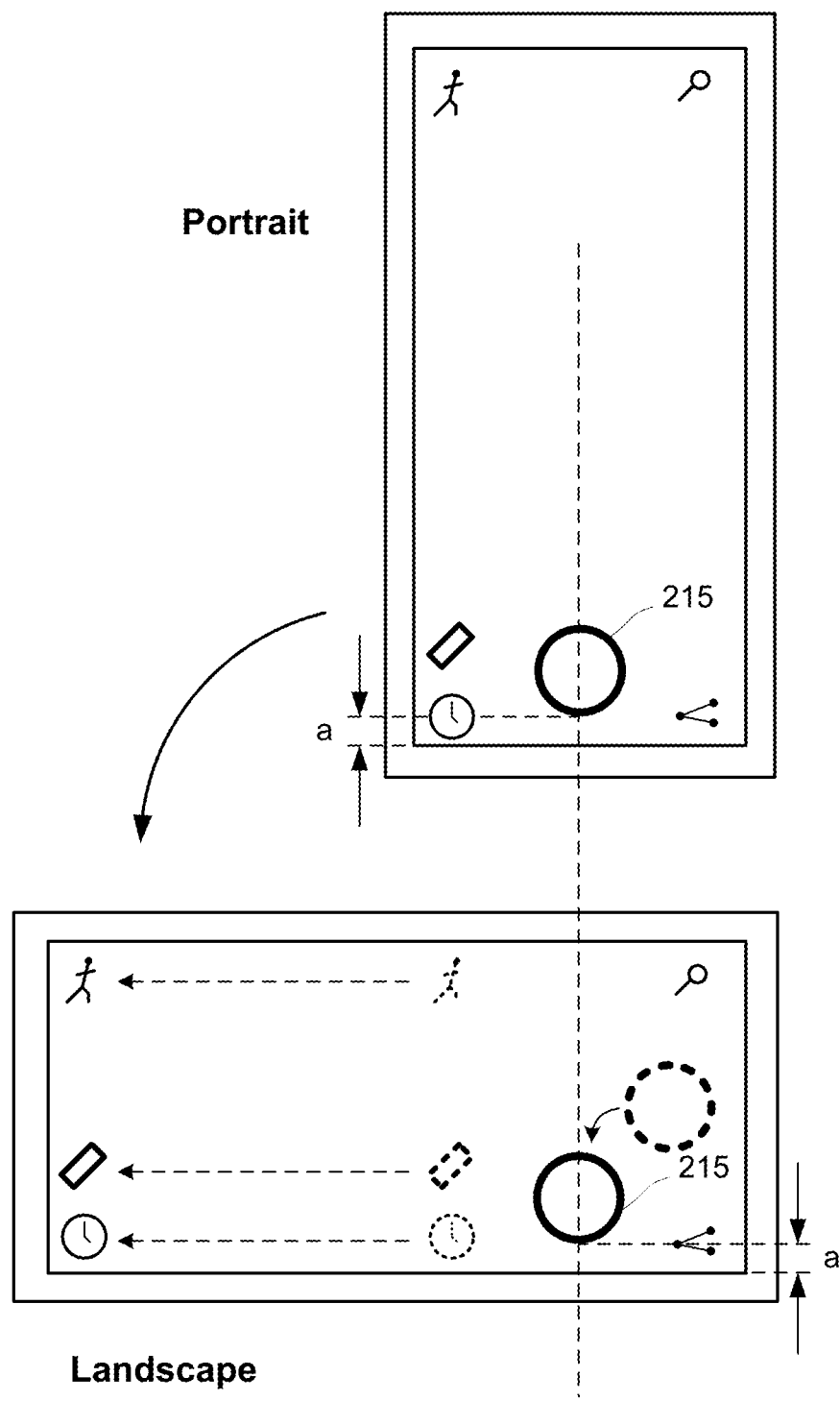
FIG. 4 illustrates exemplary navigation symbol configurations in portrait and landscape modes, according to various embodiments of the invention.

FIG. 4 illustrates exemplary navigation symbol configurations for portrait and landscape modes, respectively. In the portrait mode, in these embodiments, the Symbol 215 is positioned along the vertical centerline of the Display 125 and spaced from the bottom edge of the Display 125 by a gap, a, as shown. The Symbol 215 is also spaced from the right edge of the Display 125 by another gap. In the landscape mode, Symbol 215 is likewise spaced from the bottom and right edges of the Display 125 by the same gaps. Other navigation symbols that may be present as part of the overlay in the portrait mode are similarly repositioned to maintain their respective gaps relative to the nearest two sides of the Display 125, as further illustrated.

Figure 5:
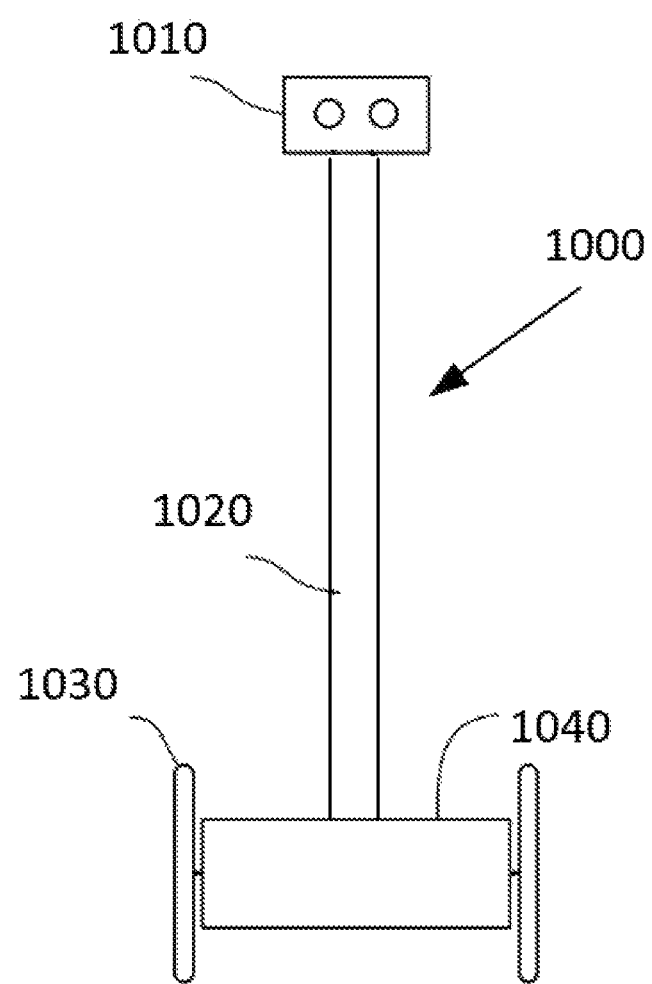
FIG. 5 is a front view of a mobile telepresence robot steerable in two dimensions and including at least one camera.

FIG. 5 is a simplified front view of a mobile telepresence robot 1000. Camera head 1010 includes at least one camera for generating images of a navigable environment. A wheeled base 1040 includes wheels 1030 driven by motors within wheeled base 1040. Camera head 1010 is supported at an elevated position by pole 1020.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps.

What is claimed is:

1. A computing device comprising:
a touchscreen display; and
logic including a micro-processor and configured to
display an image of a navigable environment on the touchscreen display, the image characterized by a viewpoint having a position in the navigable environment and an angle in the navigable environment,
receive touch information from the touchscreen display,
filter the touch information to identify contact gestures each having an origination point on the display, and
for contact gestures having an origination point within a first part of the touchscreen display, vary the image on the touchscreen display to change the position of the viewpoint of the image, and
for contact gestures having an origination point within a second part of the touchscreen display that does not overlap with the first part of the touchscreen display, vary the image on the touchscreen display to change an angle of the viewpoint of the image, and
for contact gestures including a swipe and having the origination point within the second part of the touchscreen display, to vary the angle of the viewpoint proportionally to a length of the swipe, relative to a current position of the viewpoint of the image.

2. A computing device comprising:
a touchscreen display; and
logic including a micro-processor and configured to
display an image of a navigable environment on the touchscreen display, the image characterized by a viewpoint having a position in the navigable environment and an angle in the navigable environment,
receive touch information from the touchscreen display,
filter the touch information to identify contact gestures each having an origination point on the display, and
for contact gestures having an origination point within a first part of the touchscreen display, vary the image on the touchscreen display to change the position of the viewpoint of the image, and
for contact gestures having an origination point within a second part of the touchscreen display that does not overlap with the first part of the touchscreen display, vary the image on the touchscreen display to change an angle of the viewpoint of the image, and
for contact gestures having the origination point within the first part of the touchscreen display, to vary the position of the viewpoint proportionally to a length of a touch contact time on the touchscreen display.

3. A computing device comprising:
a touchscreen display; and
logic including a micro-processor and configured to
display an image of a navigable environment on the touchscreen display, the image characterized by a viewpoint having a position in the navigable environment and an angle in the navigable environment,
receive touch information from the touchscreen display,
filter the touch information to identify contact gestures each having an origination point on the display, and
for contact gestures having an origination point within a first part of the touchscreen display, vary the image on the touchscreen display to change the position of the viewpoint of the image, and
for contact gestures having an origination point within a second part of the touchscreen display that does not overlap with the first part of the touchscreen display, vary the image on the touchscreen display to change an angle of the viewpoint of the image, and
for contact gestures having the origination point within the first part of the touchscreen display and having a curved swipe, to vary the position of the viewpoint along a curve.

4. A handheld computing device comprising:
a touchscreen display;
an orientation sensor; and
logic including a micro-processor and configured to
  display an image of a navigable environment on the touchscreen display, the image characterized by a viewpoint having a position in the navigable environment and an angle in the navigable environment,
  receive touch information from the touchscreen display,
  filter the touch information to identify contact gestures each having an origination point on the display, and
    for contact gestures having an origination point within a first part of the touchscreen display, vary the image on the touchscreen display to change the position of the viewpoint of the image, and
    for contact gestures having an origination point within a second part of the touchscreen display that does not overlap with the first part of the touchscreen display, vary the image on the touchscreen display to change an angle of the viewpoint of the image
and the logic is further configured to
  receive orientation information from the orientation sensor,
  switch the display of the image of the navigable environment between landscape mode and portrait mode based on the orientation information, and
    when in the portrait mode, position the first part of the touchscreen display such that it is spaced apart from a first edge of the touchscreen display by a first distance, and spaced apart from a second edge of the touchscreen display, which is longer than the first edge, by a second distance, and
    when in the landscape mode, position the first part of the touchscreen display such that it is spaced apart from the first edge of the touchscreen display by the second distance, and spaced apart from the second edge of the touchscreen display by the first distance.

5. The computing device of claim 2 wherein the computing device is a hand-held device, and wherein the hand-held device includes an orientation sensor, and the logic is further configured to:
  receive orientation information from the orientation sensor,
  switch the display of the image of the navigable environment between landscape mode and portrait mode based on the orientation information,
  overlay a first symbol over the image of the navigable environment, the first symbol being aligned with the first part of the touchscreen display, and
  when the display of the image of the navigable environment is switched to the landscape mode, overlay a second symbol over the image of the navigable environment, the second symbol being aligned with a third part of the touchscreen display within the second part of the touchscreen display,
  wherein the logic is further configured, while in the landscape mode, to filter the touch information to identify contact gestures that originate within the third part of the touchscreen display, and to vary the image on the touchscreen display to change the angle of the viewpoint of the image in response thereto.

6. The computing device of claim 2 wherein the logic is further configured to overlay a first symbol over the image of the navigable environment, the first symbol being aligned with the first part of the touchscreen display, and wherein the logic is further configured to overlay a second symbol over the image of the navigable environment, the second symbol being aligned with the second part of the touchscreen display.

7. The computing device of claim 2 wherein the second part of the touchscreen display comprises the entire area of the touchscreen display outside of the first part of the touchscreen display.

8. The computing device of claim 2 wherein the navigable environment comprises a virtual reality environment, a game environment, or a real environment.

9. The computing device of claim 2 wherein the logic is further configured to overlay a mini-map of the navigable environment over the image of the navigable environment.

10. The computing device of claim 2 further comprising an I/O configured to communicate with external devices via a communication channel.

11. The computing device of claim 2 further comprising an image storage configured to store a representation of a navigable environment.

12. The computing device of claim 2 further comprising an image source configured to generate information sufficient to create a representation of a navigable environment.

13. The computing device of claim 3 wherein the computing device is a hand-held device, and wherein the hand-held device includes an orientation sensor, and the logic is further configured to:
  receive orientation information from the orientation sensor,
  switch the display of the image of the navigable environment between landscape mode and portrait mode based on the orientation information,
  overlay a first symbol over the image of the navigable environment, the first symbol being aligned with the first part of the touchscreen display, and
  when the display of the image of the navigable environment is switched to the landscape mode, overlay a second symbol over the image of the navigable environment, the second symbol being aligned with a third part of the touchscreen display within the second part of the touchscreen display,
  wherein the logic is further configured, while in the landscape mode, to filter the touch information to identify contact gestures that originate within the third part of the touchscreen display, and to vary the image on the touchscreen display to change the angle of the viewpoint of the image in response thereto.

14. The computing device of claim 3 wherein the logic is further configured to overlay a first symbol over the image of the navigable environment, the first symbol being aligned with the first part of the touchscreen display, and wherein the logic is further configured to overlay a second symbol over the image of the navigable environment, the second symbol being aligned with the second part of the touchscreen display.

15. The computing device of claim 3 wherein the second part of the touchscreen display comprises the entire area of the touchscreen display outside of the first part of the touchscreen display.

16. The computing device of claim 3 wherein the navigable environment comprises a virtual reality environment, a game environment, or a real environment.

17. The computing device of claim 3 wherein the logic is further configured to overlay a mini-map of the navigable environment over the image of the navigable environment.

18. The computing device of claim 3 further comprising an I/O configured to communicate with external devices via a communication channel.

19. The computing device of claim 3 further comprising an image storage configured to store a representation of a navigable environment.

20. The computing device of claim 3 further comprising an image source configured to generate information sufficient to create a representation of a navigable environment.

* * * * *